United States Patent [19]

Delpercio et al.

[11] Patent Number: 4,540,075
[45] Date of Patent: Sep. 10, 1985

[54] COMBINED BEARING AND VARIABLE SPEED VISCOUS COUPLING

[75] Inventors: Mariano Delpercio; Edward W. Molloy, both of Port Clinton, Ohio

[73] Assignee: General Motors Corporation, Detroit, Mich.

[21] Appl. No.: 611,135

[22] Filed: May 17, 1984

[51] Int. Cl.³ .............................................. F16D 31/00
[52] U.S. Cl. .................................... 192/58 R; 464/10; 464/35; 464/36
[58] Field of Search ..................... 464/10, 36, 35, 1, 2; 192/58 R

[56] References Cited

U.S. PATENT DOCUMENTS

| | | |
|---|---|---|
| 2,492,029 | 12/1949 | Beier . |
| 2,900,811 | 8/1959 | De Selms ........................ 464/36 X |
| 3,259,221 | 7/1966 | Godfrey . |
| 3,575,269 | 4/1971 | Sherman .......................... 192/58 R |
| 3,587,801 | 6/1971 | Riner ................................ 192/58 B |
| 3,910,391 | 10/1975 | Detty et al. . |
| 4,317,511 | 3/1982 | Asai ................................. 464/36 X |
| 4,437,846 | 3/1984 | Ragaly . |

*Primary Examiner*—Edward G. Favors
*Attorney, Agent, or Firm*—Patrick M. Griffin

[57] ABSTRACT

A combined variable speed viscous coupling and bearing includes a rolling element bearing that supports a driven member for relative rotation on a powered member. A viscous grease interposed and sealed with respect to the rolling elements of the bearing acts as a variable speed drive, frictionally retarding the rolling of the rolling elements when the powered member turns below a certain critical speed, thus causing the driven member to turn with the powered member in a one-to-one relationship. Above the predetermined critical speed, the rolling elements roll sufficiently through the viscous material to allow the powered member to overrun the driven member. In a preferred embodiment, the invention is disclosed as a variable speed drive for the cooling fan of a vehicle alternator.

3 Claims, 4 Drawing Figures

COMBINED BEARING AND VARIABLE SPEED VISCOUS COUPLING

This invention relates generally to viscous couplings and specifically to a combined bearing and variable speed viscous coupling.

BACKGROUND OF THE INVENTION

It is often desireable to couple a rotary driven member to a rotary powered member in such a way as to transmit a variable speed from the powered member to the driven member. It is also generally necessary to support the driven member on the powered member for relative rotation by a rolling element bearing. This serves to keep the two members concentric and to reduce friction.

An example is the typical vehicle radiator fan drive. A cooling fan driven in one-to-one relation with the engine speed would waste energy at higher engine speeds, a wasteage that increases with the cube of the engine speed. Therefore, the fan is generally driven by a viscous coupling which slips increasingly with increasing engine speed. An example is the fan drive viscous coupling shown in the U.S. patent to Godfrey U.S. Pat. No. 3,259,221. Typically, such a viscous coupling includes a rotary input member rigidly joined to a powered rotary shaft and separated from an output coupling member by a fluid-filled shear space. The output coupling member mounts a fan and is in turn mounted to the powered rotary shaft by a separate ball bearing. This serves to keep the input coupling member co-axial to the output member while allowing it to rotate relative to the input coupling member. The viscous fluid in the shear space provides a slippage between the input and output members at high engine speeds to save energy. It is also known to provide a coupling directly between a fan and the fan drive shaft, as is shown in the U.S. patent to Beier U.S. Pat. No. 2,492,029. There, a generally torus-shaped pair of rubber elements is clamped between a drive shaft and a fan hub to support the fan hub coaxially with the drive shaft and to transmit driving torque therebetween. The rubber elements act as a slightly yielding cushioning element, but do not function as a variable speed coupling.

Another area where it may be desirable to provide a variable speed coupling between a powered member and a driven member is the cooling fan for a vehicle alternator. There is a low or critical speed range where vehicle forward motion is slow, but electrical output is high. While the fan must turn sufficiently rapidly at or below the critical speed range to cool the alternator, it will turn faster than necessary at higher speed and will waste energy. While the situation is similar to the vehicle radiator fan, the radiator fan drive described above would not fit easily in the small space available between a hub of the fan and the alternator shaft. Another problem, in addition to wasteage of energy, is increased noise level at higher fan speeds. The vibration isolator mentioned above would fit into the small space available and provide some noise reduction, but it would not provide a variable speed coupling to save energy.

SUMMARY OF THE INVENTION

The subject invention provides a variable speed viscous coupling which does fit into a small space by combining the coupling with the rolling element bearing. This provides both an energy savings and reduction in noise level.

In the preferred embodiment the invention is disclosed in an alternator fan drive assembly. An alternator drive shaft is powered by a pulley driven by a belt connected to the vehicle engine. Rather than clamping the alternator cooling fan directly to the shaft as is done conventionally, the cooling fan is mounted indirectly through a ball bearing. An inner race of the ball bearing is clamped rigidly to the shaft, while an outer race is mounted rigidly to a central annular hub of the fan. A complement of bearing balls between the races supports the fan on the shaft for relative rotation with respect thereto. A viscous grease is interposed among the bearing balls and is sealed between the races.

The viscosity of the viscous grease is chosen to be sufficient to retard the rolling of the bearing balls between the races when the alternator drive shaft is being driven below the critical speed range defined above. The action of the viscous grease on the bearing balls causes the shaft to drive the fan in a nearly one-to-one relation to provide sufficient cooling air. Above the critical speed range, the bearing balls can roll through the viscous grease and between the races. The fan, therefore, acts as an inertial element, and the alternator drive shaft can overrun the fan, a slippage which saves energy and reduces noise level at the higher shaft speeds.

In another embodiment, the invention is disclosed in an improved drive pulley assembly. A similar bearing and viscous grease is interposed between an inner and outer hub of a drive pulley. The inner hub is held rigidly to a powered rotary shaft while the co-axial outer hub is joined by a drive belt to some remote driven member. Similarly to the first embodiment, the shaft and inner hub drive the outer hub and the driven member in a substantially one-to-one relation at low shaft speeds, because of the action of the viscous grease on the bearing balls. At higher shaft speeds, the powered shaft and inner hub may overrun the outer hub and the remote driven member.

It is, therefore, an object of the invention to provide a variable speed viscous coupling between a rotatable powered member and a rotatable driven member.

It is another object of the invention to provide a viscous coupling of the type described that will fit within a small available space.

It is a further object of the invention to provide such a variable speed viscous coupling combined with a bearing by interposing a viscous grease among the rolling elements of the bearing that rotatably supports the driven member relative to the powered member, the grease having a viscosity sufficient to frictionally retard the rolling elements between the races such that the powered member will drive the driven member in a substantially one-to-one relation below a predetermined critical speed, while allowing the rolling elements to roll sufficiently between the races such that the powered member may overrun the driven member at speeds above the predetermined critical speed.

It is a still further object of the invention to provide a fan drive assembly for the cooling fan of a vehicle alternator in which a ball bearing interposed between a hub of the cooling fan and the alternator shaft contains a viscous grease interposed among the bearing balls, the grease having a viscosity sufficient to frictionally retard the rolling of the bearing balls such that the alternator shaft will drive the cooling fan in a substantially one-toone relation to supply sufficient cooling air to the alternator while the vehicle is idling or moving at slow speeds, while allowing the bearing balls to roll between the races sufficiently to allow the alternator shaft to overrun the cooling fan when the vehicle is moving at high speeds to thereby save energy and reduce noise.

BRIEF DESCRIPTION OF THE DRAWINGS

These and other objects of the invention will appear in the following written description and the drawings in which.

DESCRIPTION IN THE PREFERRED EMBODIMENT

Figure 1:
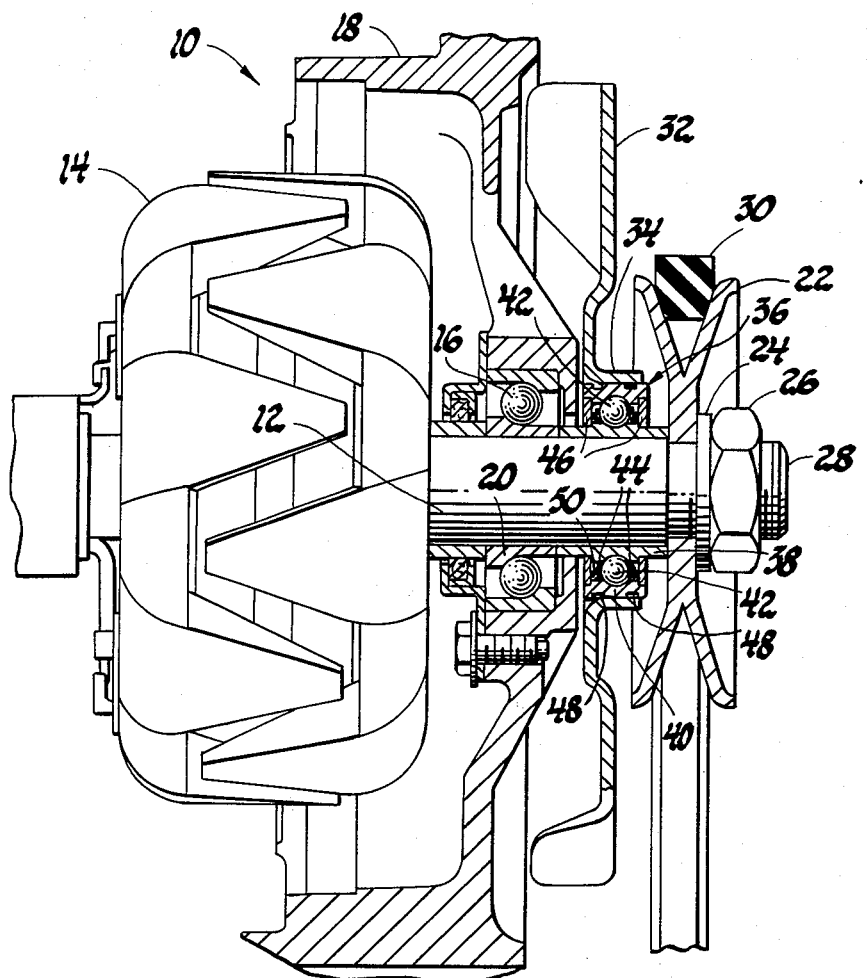
FIG. 1 shows a vehicle alternator with a cooling fan and the viscous coupling of the invention shown in a cross-section.

Referring first to FIG. 1, the first embodiment of the invention is disclosed in a fan drive assembly. A vehicle alternator designated generally at 10 includes an alternator shaft 12 and alternator windings designated generally at 14. The details of windings 14 are not significant to the invention, but they must be cooled during the operation of alternator 10 to avoid component damage. Alternator shaft 12 is supported by a standard bearing 16 within an alternator housing 18. Bearing 16 has an inner race 20 press fit to shaft 12. Shaft 12 is powered by drive pulley 22 mounted rigidly to shaft 12 by a washer 24 and nut 26 threaded onto a turned down and threaded end 28. Drive pulley 22, and shaft 12, are powered by a drive belt 30 driven by a vehicle engine pulley, not shown. The relation of drive pulley 22 to the vehicle engine pulley is such that the shaft 12 turns 2.5 to 3 times engine speed. The above described elements of alternator 10 are conventional.

Still referring to FIG. 1, the alternator cooling fan designated generally at 32 has a central, annular hub 34. The limited space or volume between hub 34 and shaft 12 is what is available for a fan drive assembly. A conventional alternator cooling fan would be rigidly joined to shaft 12 and would turn always in a one-to-one relation therewith. The greatest need for cooling to windings 14 occurs below a certain predetermined critical speed, or range of speeds, of shaft 12. The vehicle engine will then be idling or driving the vehicle slowly forward, and windings 14 will experience a high electrical output and a high temperature. For the alternator 10 shown, this critical speed range at the alternator shaft 12 is 2500–3000 rpm's. While a conventional rigid fan-shaft connection works well below this critical speed, it wastes energy and creates excessive noise at higher speeds, a wasteage which increases with the cube of the speed. The invention reduces this wasteage and noise, while still providing sufficient cooling, as is next described.

Still referring to FIG. 1, a ball bearing designated generally at 36 includes an extended inner race 38 and outer race 40 with a complement of 10 3/16" diameter bearing balls 42 therebetween, held in cage 44. The bore diameters of inner race 38 and 40 are 17 mm. and 35 mm. respectively. The lubricant space between races 38 and 40 is sealed with standard annular seals 46. Extended inner race 38 fits closely upon shaft 12 and is clamped between drive pulley 22 and inner race 20 of shaft bearing 16. Outer race 40 fits tightly within fan hub 34, and a pair of grooves 48 on the outside of race 40 may be filled with adhesive to rigidify the connection, if desired. Bearing balls 42 rotatably and coaxially mount fan 32 upon shaft 12, and fit easily, along with races 38 and 40, within the space available. Bearing balls 42 also cooperate to create a variable speed coupling, as described next.

Still referring to FIG. 1, a viscous grease 50 is interposed around bearing balls 42 and between seals 46 with a fill of 25–30%. Grease 50 is synthetic and uses a silicone oil with a tetrafluoroethylene thickener. It has a very high viscosity of 2,360 SUS at 100° F., and a wide operating temperature range of −30° to 450° F. It may be purchased commercially from the Amoco Oil Company, under the designation M-125. A grease 50 of this viscosity would not normally be a logical choice for a lightly loaded bearing. In fact, a bearing would normally be designed to do the opposite of what bearing 36 is intended to do here. As discussed in the book *Standard Handbook of Lubrication Engineering* by O'Connor and Boyd, McGraw-Hill, 1968, at page 6–9, "The friction torque due to the turbulent action of the lubricant is usually small at low speeds if the lubrication system has been designed to allow adequate movement of the oil or grease out of the path of the rolling elements. At high speeds the torque due to turbulence and windage may be a major part of the total friction torque."

Figure 2:
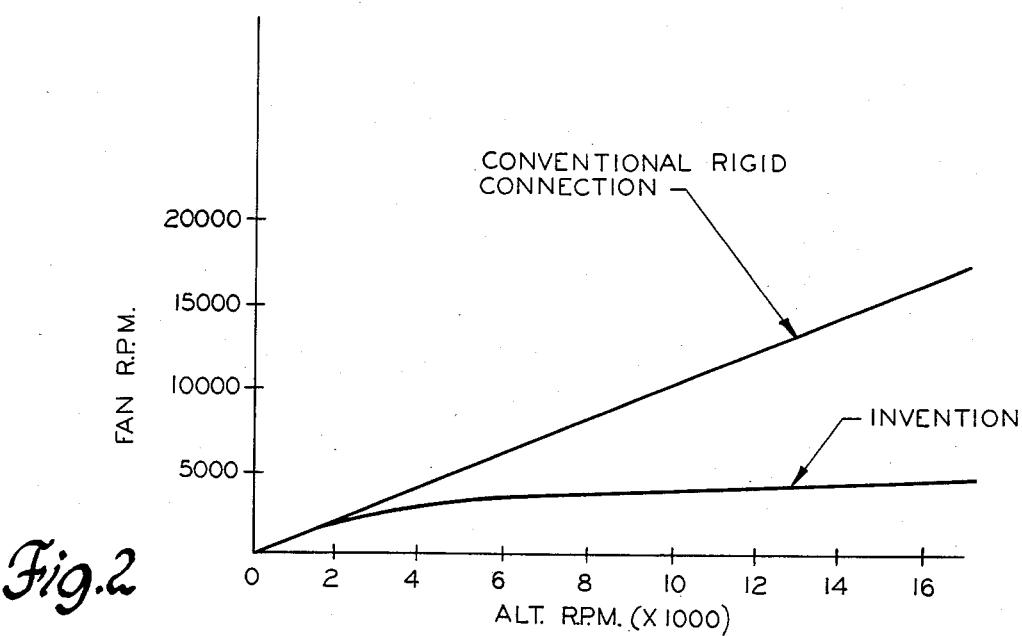
FIG. 2 is a graph comparing fan and alternator shaft speeds for both the fan drive assembly of the invention and a conventional rigid fan-shaft connection.
Figure 3:
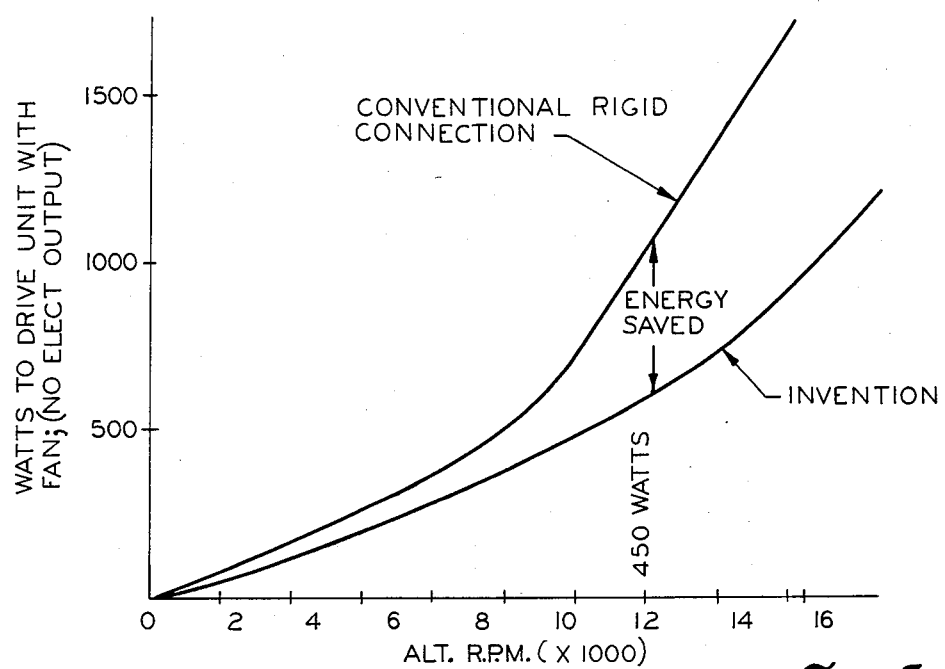
FIG. 3 is a graph showing the energy saved with the fan drive assembly of the invention compared to a rigid connection.

In the invention, the grease 50 is designed to allow inadequate movement out of the path of bearing balls 42 at low speeds, that is, at speeds of shaft 12 below the critical speed range of 2500–3000 rpm's. The viscosity of grease 50 will frictionally retard the rolling of balls 42 and prevent them from rolling freely between races 38 and 40. Outer race 40, and hence cooling fan 32, will turn with inner race 38 and be driven by shaft 12 in a substantially one-to-one relation below that critical speed range. This may be seen in the graph of FIG. 2. Thus, sufficient cooling air will be provided to alternator windings 14. Above that speed range, however, cooling fan 32 will act as an inertial element and bearing balls 42 will roll sufficiently through grease 50 and between inner and outer races 38 and 40 so that shaft 12 may overrun cooling fan 32. The fan 32—shaft 12 rotation relationship is graphed in FIG. 2. The energy savings which result may be seen graphically in FIG. 3. FIG. 3 shows the situation with no electrical output from windings 14, but the energy savings would be similar with output. There is also the added benefit of a significant reduction in whine or noise of fan 32. Fan 32 may also be made from lighter weight materials than would otherwise be necessary were it necessary for fan 32 to withstand the high shaft speeds caused by a rigid connection.

Figure 4:
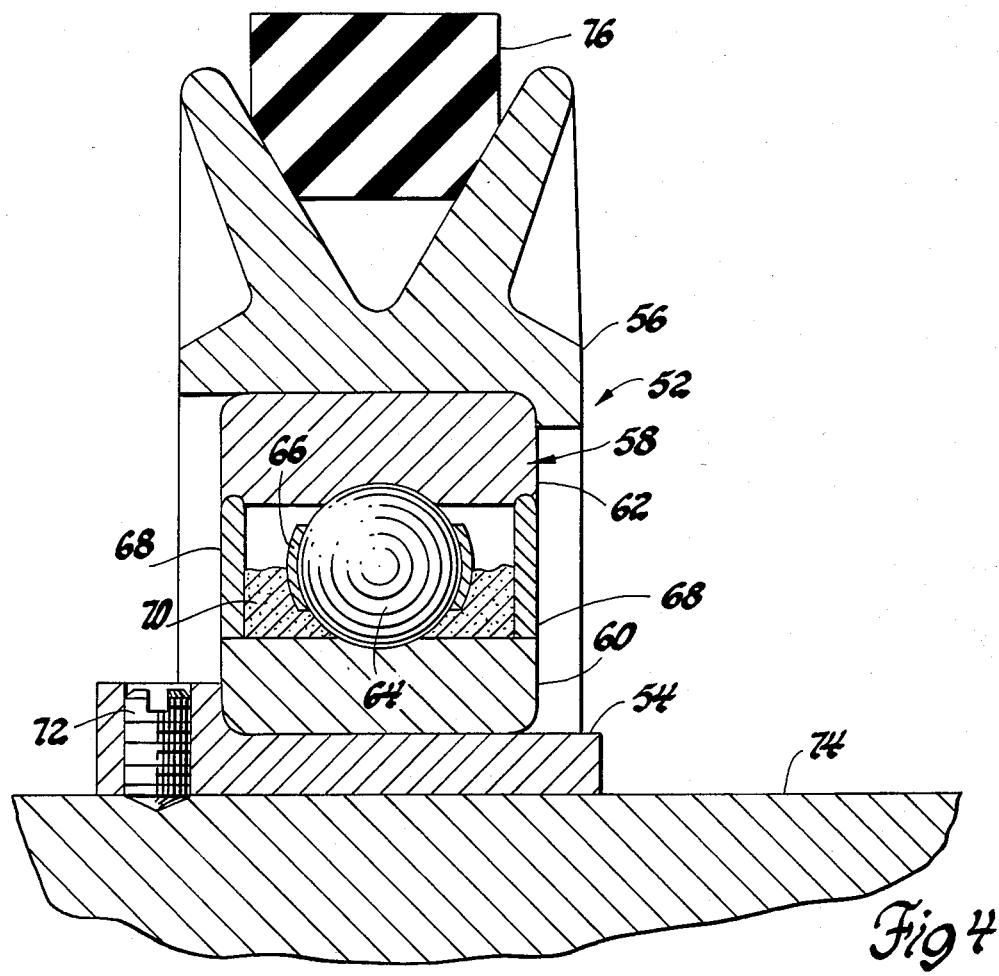
FIG. 4 is a cross-sectional view showing a second embodiment of the invention.

A second embodiment may be used in a drive pulley assembly to drive a remote driven member from a powered shaft. As seen in FIG. 4, a drive pulley designated generally at 52 has an inner hub 54 and outer hub 56 with a limited space therebetween. Inner and outer hubs 54 and 56 are coaxially and rotatably supported relative to each other on a ball bearing 58. Bearing 58 has an inner race 60 press fit within inner hub 54 and an outer race 62 press fit within outer hub 56. As in the first embodiment, a complement of bearing balls 64 held in a cage 66 ride between races 60 and 62 with a lubricant space therearound sealed by annular seals 68. A fill of grease 70 similar to the first embodiment is interposed around bearing balls 64. Inner hub 54 is rigidly held, as by a set screw 72, to a powered shaft 74. A drive belt 76 riding in outer hub 56 would run to a remote driven member, not shown, which could be a fan or other rotary member.

The operation of this second embodiment would be similar to the first. Below a critical speed of the powered shaft 74, bearing balls 64 would be frictionally retarded by the viscous grease 70 to allow shaft 74 and inner hub 54 to drive outer hub 56 in a substantially one-to-one relation. This would, in turn, drive the belt 76 and the remote driven member in a substantially one-to-one relation with shaft 74. At higher speeds, the inner hub 54 and shaft 74 could overrun outer hub 56. The embodiment of FIG. 4 would be suitable wherever it was desired to drive a remote driven member at slower speeds than those available from a powered shaft 74 or other power source. In addition, this embodiment could be used as a cushioning element between powered shaft 74 and a remote driven member. For example, when shaft 74 was running initially with high power and a high rotational speed, it could overrun the outer hub 56. This would impart a lag to the remote driven member which would gradually speed up as powered shaft 74 gradually slowed down, eventually approaching the one-to-one rotating relationship. Such a variable speed coupling could find usefulness in a low horsepower application such as a typical heating furnace fan drive.

Either inner hub 54 or outer hub 56 could be the powered member which drove the other through the cooperation of the bearing balls 64 and the viscous action of grease 70. Therefore, it is possible that shaft 74 could be the driven member, belt 76 could run to a motor, and shaft 74 could have a fan rigidly joined thereto. However, the invention will find its greatest usefulness in low horsepower applications such as those disclosed. It will be understood that the variable speed viscous coupling and combined bearing of the invention could be used in other embodiments where it was desired to achieve the same variable speed coupling with a compact structure that fits into a limited space. Therefore, the invention is not intended to be limited to those embodiments disclosed.

The embodiments of the invention in which an exclusive property or privilege is claimed are defined as follows:

1. A combined bearing and variable speed viscous coupling wherein rolling elements of a bearing both support a driven rotary member relative to a powered rotary member and cooperate to allow the powered member to variably drive the driven member, comprising, a bearing having a first race adapted to be rigidly joined to the powered member and a second race adapted to be rigidly joined to the driven member with a complement of rolling elements disposed therebetween to support the rotary members in co-axial relation for relative rotation, and a viscous material interposed among the rolling elements and sealed with respect thereto and having a viscosity chosen so as to sufficiently frictionally retard the rolling of the rolling elements between the races such that the powered member will drive the driven member in a substantially one-to-one relation when the powered member is rotating below a predetermined speed, while allowing the rolling elements to roll between the races sufficiently such that the powered member may overrun the driven member when the powered member is rotating above said predetermined speed.

2. In combination with a vehicle driven alternator shaft, a fan drive assembly adapted to drive a shaft mounted cooling fan at a variable speed relative to the alternator shaft to supply sufficient air to cool the alternator and prevent component damage when the vehicle driving said alternator shaft is operating at speeds from idle to fast, said fan drive assembly comprising;

a bearing having a first race adapted to be rigidly joined to the alternator shaft and a second race adapted to be rigidly joined to the cooling fan with a complement of rolling elements disposed therebetween to support the fan and shaft for relative rotation, and a viscous grease interposed among the rolling elements and sealed with respect thereto having a viscosity chosen so as to sufficiently frictionally retard the rolling of the rolling elements between the races such that the alternator shaft will drive the cooling fan in a substantially one-to-one relation when the alternator shaft is being driven by said vehicle operating at said idle or low speed, while allowing the rolling elements to roll between the races sufficiently such that the alternator shaft may overrun the cooling fan when the alternator shaft is being driven by said vehicle at said fast speed, whereby energy required of the vehicle to drive the cooling fan and noise resulting therefrom is reduced.

3. An improved drive pulley assembly of the type having inner and outer hubs, one of which is powered and one of which is driven, wherein rolling elements of a bearing both support the hubs for relative rotation and cooperate to allow the powered hub to variably drive the driven hub, comprising;

a bearing having a first race adapted to be rigidly joined to the powered hub and a second race adapted to be rigidly joined to the driven hub with a complement of rolling elements disposed therebetween to support the inner and outer hubs in coaxial relation for relative rotation, and a viscous material interposed among the rolling elements and sealed with respect thereto and having a viscosity chosen so as to sufficiently frictionally retard the rolling of the rolling elements between the races such that the powered hub will drive the driven hub in a substantially one-to-one relation when the powered hub is rotating below a predetermined speed, while allowing the rolling elements to roll between the races sufficiently such that the powered hub may overrun the driven hub when the powered hub is rotating above said predetermined speed.

* * * * *